United States Patent [19]

Abe et al.

[11] Patent Number: 5,082,888
[45] Date of Patent: Jan. 21, 1992

[54] POLYPROPYLENE RESIN COMPOSITION HAVING HIGH DIELECTRIC STRENGTH

[75] Inventors: Masaru Abe, Osaka; Yoichi Kawai; Minoru Hoshino, both of Kanagawa, all of Japan

[73] Assignee: Mitsui Toatsu Chemicals, Inc., Tokyo, Japan

[21] Appl. No.: 416,355

[22] Filed: Oct. 3, 1989

[30] Foreign Application Priority Data

Oct. 7, 1988 [JP] Japan .................. 65-252022

[51] Int. Cl.$^5$ ............................. C08K 3/34
[52] U.S. Cl. ...................... 524/449; 524/451
[58] Field of Search ................. 524/449, 451

[56] References Cited

U.S. PATENT DOCUMENTS

| | | | |
|---|---|---|---|
| 4,501,843 | 2/1985 | Needham | 524/449 |
| 4,552,689 | 11/1985 | Yui | 524/449 |
| 4,603,153 | 7/1986 | Sobajima | 524/449 |
| 4,686,257 | 8/1987 | Mitsuno | 524/449 |
| 4,761,481 | 8/1988 | Moteki | 324/449 |

FOREIGN PATENT DOCUMENTS

| | | |
|---|---|---|
| 165662 | 12/1985 | European Pat. Off. . |
| 59-43045 | 10/1984 | Japan . |
| 62-273240 | 11/1987 | Japan . |

*Primary Examiner*—Paul R. Michl
*Assistant Examiner*—Peter Szekely
*Attorney, Agent, or Firm*—Burns, Doane, Swecker & Mathis

[57] ABSTRACT

The present invention relates to a polypropylene resin composition having high dielectric strength comprising:

A) from about 50% to about 80% by weight of a crystalline ethylene-propylene block copolymer having a melt flow index (MI) at 230° C. of not less than about 3 g/10 min and an ethylene content of not less than about 4% by weight;

B) from about 15% to about 30% by weight of mica having an average particle size of from about 15 to about 50 microns and the following particle size distribution:
   $\geq 30$ microns from about 10% to about 80% by weight
   $\geq 20$ microns from about 30% to about 95% by weight
   $\geq 10$ microns not less than about 60% by weight
   $\geq 5$ microns not less than about 80% by weight C) from about 5% to about 20% by weight of talc having an average particle size of from about 15 to about 40 microns and the following particle size distribution:
   $\geq 30$ microns from about 20% to about 65% by weight
   $\geq 20$ microns from about 40% to about 80% by weight
   $\geq 10$ microns from about 65% to about 95% by weight
   $\geq 5$ microns not less than about 85% by weight.

11 Claims, No Drawings

POLYPROPYLENE RESIN COMPOSITION HAVING HIGH DIELECTRIC STRENGTH

BACKGROUND OF THE INVENTION

1. Field of the Invention

The present invention relates to a polypropylene resin composition having a high dielectric strength.

2. Discussion of the Prior Art

Polypropylene resins exhibit excellent mechanical properties, chemical properties, thermal properties, moldability and electrical properties and, therefore, have been used the manufacture of various industrial goods and products. Further, it is known that certain properties of polypropylene resins for example, rigidity, heat resistance, dimensional stability and resistance to marring can be improved by incorporating inorganic fillers into the polypropylene resin. The electrical properties of polypropylene resins, particularly, dielectric strength is improved by the incorparation of talc or clay in the polypropylene resin. Such resin compositions have been used in making parts, which have a high dielectric strength, such as a distributor's rotor of automobile engines.

Recently, there has been a demand in industry for polypropylene resin compositions having improved dielectric strength. For example, as a result of regulations in the automobile industry concerning exhaust emissions, a higher voltage must be applied to the rotor portion of a distributor. The resin compositions conventionally employed do not have a high enough dielectric strength to withstand such high voltages.

The present inventors previously proposed employing a polypropylene resin composition containing mica having a specific particle size distribution and an average particle size in a specified amount (J.P. KOKAI No. 62-273240) in applications in which a high dielectric strength is required. However, as shown in comparative Example I set forth herein, the proposed polypropylene resin composition exhibits excellent dielectric strength but has a low flowability and is very brittle. Thus, the resulting molded products are liable to crack and have defects, depending on their shape. As a result, the possible shapes of the molded products are limited, and the molded articles do not have a good appearance.

SUMMARY OF THE INVENTION

The present invention overcomes the problems and disadvantages of the prior art by providing polypropylene resin compositions that have a high dielectric strength, good flowability and are not brittle.

It is an object of the present invention to provide polypropylene resin compositions which exhibit excellent dielectric strength, do not show reduction in flowability, and are not restricted with respect to the shapes of the resulting molded products. It is a further object of the invention to provide polypropylene resin compositions that are useful for preparing molded products having improved rigidity and good appearance.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

To achieve the objects and in accordance with the purpose of the invention, as embodied and broadly described herein, the invention provides a polypropylene resin composition comprising:

A) from about 50% to about 80% by weight of a crystalline ethylene-propylene block copolymer having a melt flow index (MI) at 230° C. of not less than about 3 g/10min and an ethylene content of not less than about 4% by weight;

B) from about 15% to about 30% by weight of mica having an average particle size of from about 15 to about 50 microns and the following particle size distribution:

$\geq$30 microns from about 10% to about 80% by weight $\geq$20 microns from about 30% to about 95% by weight $\geq$10 microns not less than about 60% by weight $\geq$5 microns not less than about 80% by weight C) from about 5% to about 20% by weight of talc having an average particle size of from about 15 to about 40 microns and the following particle size distribution:

$\geq$30 microns from about 20% to about 65% by weight $\geq$20 microns from about 40% to about 80% by weight $\geq$10 microns from about 65% to about 95% by weight $\geq$5 microns not less than about 85% by weight.

DESCRIPTION OF THE PREFERRED EMBODIMENTS

Preferably, the polypropylene resins employed in the invention are crystalline ethylene-propylene block copolymers having a melt flow index (MI) at 230° C. of not less than about 3 g/10min and an ethylene content of not less than about 4% by weight. The upper limit of MI is not particularly limited and preferably, is about 60 g/10min. The upper limit of ethylene content is not particularly limited and preferably, is about 30% by weight.

The inventors have found that if a polypropylene resin having an MI of less than about 3 g/10min is used, the resultant resin composition has low flowability and insufficient moldability. In addition, if a propylene homopolymer, an ethylene-propylene random copolymer or a copolymer having an ethylene content of less than about 4% by weight is employed, the resultant resin composition becomes brittle.

The polypropylene resins of the invention may contain polypropylene resins modified with a radical polymerizable unsaturated compound (hereinafter referred to as "modified polypropylene resin"). When such a modified polypropylene resin is employed, adhesion with mica is enhanced, mechanical properties and dielectric strength are further improved. Exemplary suitable radical polymerizable unsaturated compounds suitable for use in the invention include acrylic acid, methacrylic acid, itaconic acid, maleic acid, maleic anhydride, itaconic anhydride, 2-hydroxyethyl acrylate and 2-hydroxyethyl methacrylate. Any known method may be used to prepare modified polypropylene resins from homopolymers of propylene or copolymers of propylene and α-olefin. An exemplary suitable method is disclosed in Japanese Patent Publication (hereafter referred to as "J.P. KOKOKU") No. 59-43045.

When a modified polypropylene resin is employed, it is preferably employed in an amount such that the radical polymerizable unsaturated compound of the modified polypropylene resin is not greater than about 3% by weight based on the amount of the inorganic filler. If employed in an amount greater than about 3% by weight, further improvement in the adhesive, mechanical properties and dielectric strength cannot be expected and the resulting resin composition becomes expensive. Thus, if a large amount of the radical polymerizable unsaturated compound of the modified polypropylene resin is employed, preferably an unmodified polyproplene resin is combined with the modified polypropylene resin.

The mica employed in the resin composition of the present invention has an average particle size of from about 15 to about 50 microns and the following particle size distribution:
$\geq 30$ microns about 10% to about 80% by weight
$\geq 20$ microns about 30% to about 95% by weight
$\geq 10$ microns not less than about 60% by weight
$\geq 5$ microns not less than about 80% by weight If mica having average particle size and particle size distribution outside the foregoing ranges is used, the dielectric strength of the resulting resin compositon is low. The particle size distribution (mica and talc) is obtained on the basis of a particle size distribution cumulative distribution curve determined by a photo electric extinction method, while the average particle size thereof is a value at 50% on the particle size distribution cumulative distribution curve.

The mica may be subjected to surface treatment. Particularly preferred agents for such surface treatment include silane type organic compounds such as silicone oil, silane coupling agents, silazanes and alkoxysilanes. The surface treatment may be performed according to any known method, such as using a Henschel mixer. The amount of the agents employed for surface treatment is preferably not more than about 5% by weight based on the amount of mica. The inventors have found that if the amount of agent employed exceeds about 5%, the rigidity of the resulting resin composition is reduced.

The talc employed in the resin composition of the present invention has an average particle size of from about 15 to about 40 microns and the following particle size distribution:
$\geq 30$ microns about 20% to about 65% by weight
$\geq 20$ microns about 40% to about 80% by weight
$\geq 10$ microns about 65% to about 95% by weight
$\geq 5$ microns not less than about 85% by weight.

If talc having an average particle size and particle size distribution outside the aforementioned ranges is employed, the resulting resin composition has a low dielectric strength.

Talc may be subjected to surface treatment in the same manner as disclosed above for the surface treatment of mica.

If surface treated mica and talc are employed, both the dielectric strength of the resin composition and its mechanical properties are improved.

If the amount of the crystalline ethylene-propylene block copolymer exceeds about 80% by weight, the dielectric strength of the resulting resin composition becomes low. If the amount is less than about 50% by weight, the flowability of the resin composition is reduced and the resin composition provides brittle molded articles having poor appearance. Moreover, if the amount of mica is less than about 15% by weight, the resulting resin composition has a low dielectric strength, while if it exceeds about 30% by weight, not only the flowability of the composition is impaired, but also the molded articles obtained from the resin composition are brittle.

If the amount of talc is less than about 5% by weight, the resultant resin composition becomes brittle, while if it exceeds about 20% by weight, the dielectric strength of the resultant resin composition becomes low.

The polypropylene resin composition may contain other resins such as polypropylene and ethylene-propylene copolymeric rubber providing they do not impair the advantages of the present invention. In addition, the resin composition may contain various additives such as antioxidants, ultraviolet absorbers, ultraviolet stabilizers, nucleating agents, metal deterioration inhibiting agents and organic and inorganic pigments, which are usually added to polypropylene resins. These additives may be used alone or in combination.

The resin composition of the present invention can be obtained by premixing the foregoing ingredients in a Henschel mixer and melting and kneading them in a single screw extruder or a twin-screw extruder to form pellets thereof. The pellets obtained may be formed into any shape by molding methods such as extrusion molding, injection molding, rotational molding and compression molding. The resin composition of the present invention may be formed into articles without pelletizing the same.

Molded articles formed from the polypropylene resin composition of the invention have excellent rigidity, a good appearance and extremely high dielectric strength. The polypropylene resin composition of the present invention can be used in applications in which high dielectric strength is required, for example, in a distributor's rotor of automobile engines.

The present invention will be clarified by the following examples, which are intended to be purely exemplary of the invention.

In the following description, MI is determined according to ASTM D-1238, Dupont impact strength according to JIS K-6718, Izod impact strength according to ASTM D-256 and gloss according to ASTM D-523, respectively.

In the following Examples, the dielectric strength was determined by inserting a plate of polypropylene resin having a thickness of 8.5 mm between electrodes disposed at a terminal-to-terminal distance of 8.5 mm, applying a voltage of 30 kV therebetween in an atomosphere maintained at 100° C. and determining the time elapsed untill the leakage current was detected.

The type of inorganic fillers employed, their particle size distribution and average particle size are set forth in Table I.

TABLE I

| Classification | Kind | Particle Size Distribution (wt %) | | | | Average Particle Size (μm) |
| --- | --- | --- | --- | --- | --- | --- |
| | | $\geq 30$ | $\geq 20$ | $\geq 10$ | $\geq 5$ | |
| A | Mica | 30 | 53 | 78 | 91 | 21 |
| B | " | 60 | 78 | 93 | 96 | 37 |
| C | " | — | 3 | 45 | 68 | 8.5 |
| D | Talc | 30 | 48 | 78 | 90 | 19.5 |
| E | " | 5 | 22 | 46 | 72 | 9.2 |

EXAMPLES 1 to 4

To a mixture containing a crystalline ethylene-propylene block copolymer (hereafter referred to as "PP-A")

and the inorganic fillers listed in Table I in amounts shown in Table II, a small amount of an antioxidant, a metallic soap and a metal deterioration inhibiting agent were added. The ingredients were admixed, and the mixture was pelletized in an ordinary manner to form specimens for determining general physical properties and plates having a thickness of 8.5 mm for determining dielectric strength.

The results obtained are summarized in Table II.

EXAMPLE 5

350 g of propylene homopolymer and 4.5 liters of chlorobenzene were introduced into a 5 liter autoclave in a stream of nitrogen and heated to 130° C. with stirring. To the solution, over 3 hours was added, a mixed solution obtained by admixing a solution of 35 g of dicumyl peroxide in 280 ml of chlorobenzene and a solution of 50 g of maleic anhydride in 160 ml of acetone. Thereafter, the resultant mixed solution was stirred at 130° C. for an additional 2.5 hours to complete the reaction. After cooling the reaction solution, the resulting slurry was poured into a large amount of acetone, the precipitates were filtered and dried to thus obtain a modified polypropylene resin (hereinafter referred to as "modified PP").

The same procedures as set forth in Example 2 were repeated except that 2% by weight of the modified PP obtained above and 61% by weight of the polypropylene resin used in Example 2 were used as the polypropylene resin component.

The results obtained are summarized in Table II.
Comparative Examples 1 to 5

The same procedures as set forth in Example 1 were repeated except that PP-A and the inorganic fillers were used in amounts listed in Table II.

The results obtained are set forth in Table III. Comparative Examples 6 and 7

The same procedures as in Example 3 were repeated except that an ethylene-propylene block copolymer (PP-B) having an MI of 1.5 g/10min and an ethylene content of 6.8% by weight, and a propylene homopolymer (PP-C) having an MI of 8 g/10min were used.

The results are summarized in Table III.

Other embodiments of the invention will be apparent to those skilled in the art from consideration of the sepcification and practice of the invention disclosed herein. It is intended that the specification and examples be considered as exemplary only, with a true scope and spirit of the invention being indicated by the following claims.

TABLE II

|  |  | Unit | Ex. 1 | Ex. 2 | Ex. 3 | Ex. 4 | Ex. 5 |
|---|---|---|---|---|---|---|---|
| PP | PP-A | wt % | 70 | 63 | 60 | 60 | 61 |
|  | Modified PP |  |  |  |  |  | 2 |
|  | PP-B |  |  |  |  |  |  |
|  | PP-C |  |  |  |  |  |  |
| Mica | A |  |  | 20 | 20 | 25 |  | 20 |
|  | B |  |  |  |  | 25 |  |
|  | C |  |  |  |  |  |  |
| Talc | D |  |  | 10 | 17 | 15 | 15 | 17 |
|  | E |  |  |  |  |  |  |
| Physical | MI | g/10 min | 15.0 | 14.2 | 13.1 | 12.8 | 15.2 |
| Properties | Dupont Impact Resistance | kg·cm/½" φ | 28~33 | 25~30 | 22~27 | 25~30 | 30~35 |
|  | Izod Impact Resistance | kg·cm/cm | 3.4 | 3.0 | 3.0 | 2.9 | 3.5 |
|  | Gloss | % | 25 | 23 | 20 | 21 | 25 |
| Dielectric Strength |  | Hrs | not less than 500 | ← | ← | ← | ← |

TABLE III

|  |  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| PP | PP-A | wt % | 60 | 60 | 60 | 63 | 63 |  |  | 60 |
|  | Modified PP |  |  |  |  |  |  |  |  |  |
|  | PP-B |  |  |  |  |  |  | 60 |  |  |
|  | PP-C |  |  |  |  |  |  |  | 60 |  |
| Mica | A |  | 40 | 37 | 15 |  | 20 | 25 | 25 |  |
|  | B |  |  |  |  |  |  |  |  |  |
|  | C |  |  |  |  | 20 |  |  |  |  |
| Talc | D |  |  | 3 | 25 | 17 |  | 15 | 15 | 40 |
|  | E |  |  |  |  |  | 17 |  |  |  |
| Physical | MI | g/10 min | 7.5 | 8.1 | 8.8 | 12.1 | 13.0 | 0.3 | 5.3 | 7.0 |
| Properties | Dupont Impact Resistance | kg·cm/½" φ | 7~12 | 10~15 | 30~35 | 20~25 | 22~27 | Satisfactory | 1~2 | 40~45 |
|  | Izod Impact Resistance | kg·cm/cm | 2.1 | 2.3 | 2.9 | 3.2 | 3.0 | molded piece | 2.1 | 3.5 |
|  | Gloss | % | 9 | 10 | 28 | 20 | 21 | cannot be obtained | 27 | 35 |
| Dielectric Strength |  | Hrs | not less than 500 | ← | 150 | 180 | 250 | — | not less than 500 | 100 |

What is claimed is:

1. A polypropylene resin composition comprising (a) from about 50% to about 80% by weight of a crystalline ethylene-propylene block copolymer having a melt flow index at 230° C. of not less than about 3 g/10min and an ethylene content of not less than about 4% by weight; (b) from about 15% to about 30% by weight of mica having an average particle size of from about 15 to about 50 microns and the following particle size distribution:

≧30 microns from about 10% to about 80% by weight

≧20 microns from about 30% to about 95% by weight

≧10 microns not less than about 60% by weight

≧5 microns not less than about 80% by weight and (c) from about 5% to about 20% by weight of talc having an average particle size of from about 15 to about 40 microns and the following particle size distribution:

≧30 microns from about 20% to about 65% by weight

≧20 microns from about 40% to about 80% by weight

≧10 microns from about 65% to about 95% by weight

≧5 microns not less than about 85% by weight.

2. The polypropylene resin composition of claim 1 wherein said polypropylene resin contains a polypropylene resin modified with a radical polymerizable unsaturated compound.

3. The polypropylene resin composition of claim 2 wherein said polypropylene resin modified with a radical polymerizable unsaturated compound is employed in an amount such that the radical polymerizable unsaturated compound in the modified polypropylene resin is not greater than about 3% by weight based on the amount of the inorganic filler.

4. The polypropylene resin composition of claim 3 wherein said radical polymerizable unsaturated compound is selected from the group consisting of acrylic acid, methacrylic acid, itaconic acid, maleic acid, maleic anhydride, itaconic anhydride, 2-hydroxyethyl acrylate and 2-hydroxyethyl methacrylate.

5. The polypropylene resin composition of claim 1 wherein said crystalline ethylene-propylene block copolymer has a melt flow index at 230° C. of no greater than about 60 g/10min.

6. The polypropylene resin composition of claim 1 wherein said ethylene content of said crystalline ethylene-propylene block copolymer is no greater than about 30% by weight.

7. The polypropylene resin composition of claim 1 wherein said mica is surface treated with an agent selected from the group consisting of silicone oil, silazanes and alkoxysilanes.

8. The polypropylene resin composition of claim 7 wherein said agent is employed in an amount of no greater than about 5% by weight based on the amount of mica.

9. The polypropylene resin composition of claim 1 wherein said talc is surface treated with an agent selected from the group consisting of silicone oil, silazanes and alkoxysilanes.

10. The polypropylene resin composition of claim 1 further comprising an additive.

11. The polypropylene resin composition of claim 10 wherein said additive is selected from the group consisting of antioxidants, ultraviolet absorbers, nucleating agents, metal deterioration inhibiting agents, organic pigments and inorganic pigments.

* * * * *